United States Patent
Wegner et al.

(10) Patent No.: US 9,726,398 B2
(45) Date of Patent: Aug. 8, 2017

(54) SYSTEM AND METHOD FOR CONTROL OF A FLUID HEATING APPARATUS

(71) Applicants: Mark Wegner, Sioux Falls, SD (US); Brad Hyronimus, Beresford, SD (US); John W. Finger, Beresford, SD (US)

(72) Inventors: Mark Wegner, Sioux Falls, SD (US); Brad Hyronimus, Beresford, SD (US); John W. Finger, Beresford, SD (US)

(73) Assignee: Sioux Corporation, Beresford, SD (US)

(*) Notice: Subject to any disclaimer, the term of this patent is extended or adjusted under 35 U.S.C. 154(b) by 225 days.

(21) Appl. No.: 14/561,262

(22) Filed: Dec. 5, 2014

(65) Prior Publication Data
US 2016/0161143 A1 Jun. 9, 2016

(51) Int. Cl.
| | |
|---|---|
| F24H 1/08 | (2006.01) |
| F24H 1/10 | (2006.01) |
| G01K 13/02 | (2006.01) |
| F24H 1/22 | (2006.01) |
| G05D 9/12 | (2006.01) |
| G05D 23/19 | (2006.01) |
| G05D 27/02 | (2006.01) |
| G01F 23/00 | (2006.01) |

(52) U.S. Cl.
CPC ............ *F24H 1/107* (2013.01); *F24H 1/225* (2013.01); *G01K 13/02* (2013.01); *G05D 9/12* (2013.01); *G05D 23/1919* (2013.01); *G05D 27/02* (2013.01); *G01F 23/00* (2013.01); *G01K 2013/026* (2013.01)

(58) Field of Classification Search
CPC ...... F24H 1/08; F24D 15/02; F24D 2220/042; F26D 17/0036
USPC ........... 122/14.3, 14.1, 14.2, 14.21; 392/307, 392/308
See application file for complete search history.

(56) References Cited

U.S. PATENT DOCUMENTS

| | | | |
|---|---|---|---|
| 8,857,736 B1* | 10/2014 | Finger ....................... | B08B 3/00 239/135 |
| 8,971,694 B2* | 3/2015 | Deivasigamani . | G06F 17/30902 122/14.1 |
| 9,062,895 B2* | 6/2015 | Deivasigamani ... | F24D 17/0026 |
| 9,063,551 B2* | 6/2015 | Deivasigamani .... | G05D 7/0629 |
| 9,158,312 B2* | 10/2015 | Huang ............... | G05D 23/1902 |
| 9,234,679 B2* | 1/2016 | Deivasigamani ... | F24D 17/0026 |
| 2011/0042470 A1* | 2/2011 | Deivasigamani .. | G05D 23/1909 236/51 |

(Continued)

*Primary Examiner* — Gregory A Wilson
(74) *Attorney, Agent, or Firm* — Jeffrey A. Proehl; Woods Fuller Shultz & Smith, P.C.

(57) ABSTRACT

A fluid heating apparatus for heating fluid on a fluid path may comprise a fluid pump, a fluid heater, a temperature sensor to sense fluid temperature and generate a temperature signal, and a temperature control assembly configured to control the temperature of the fluid. The control assembly may comprise a target temperature input to receive a target temperature, a pump control to control operation of the fluid pump to control a flow rate of the fluid, and a heater control to control operation of the fluid heater to control a degree of heat output by the fluid heater. The temperature control assembly may be configured to increase and decrease fluid flow along the fluid path and to increase and decrease heat output of the fluid heater to control the temperature of the fluid at the fluid outlet.

18 Claims, 3 Drawing Sheets

(56) References Cited

U.S. PATENT DOCUMENTS

2014/0229022 A1* 8/2014 Deivasigamani .... G05D 7/0629
700/282

* cited by examiner

SYSTEM AND METHOD FOR CONTROL OF A FLUID HEATING APPARATUS

BACKGROUND

Field

The present disclosure relates to fluid heaters and more particularly pertains to a new system and method for control of a fluid heating apparatus for enhancing the control possible for heating fluid.

SUMMARY

In one aspect, the present disclosure relates to a fluid heating apparatus for heating fluid moving along a fluid path between a fluid inlet and a fluid outlet. The fluid heating apparatus may comprise a fluid pump configured to pump fluid along the fluid path, a fluid heater configured to heat fluid moving along the fluid path, the fluid heater comprising a heat generator, and a temperature sensor configured to sense temperature of fluid on the fluid path and generate a temperature signal representative of the temperature of the fluid. The fluid heating apparatus may also comprise a temperature control assembly configured to control the temperature of fluid on the fluid path at the fluid outlet, with the temperature control assembly being in communication with the temperature sensor to receive the temperature signal. The temperature control assembly may comprise a target temperature input configured to receive designation of a target temperature for the fluid on the fluid path at the fluid outlet, a pump control configured to control operation of the fluid pump to control a flow rate of fluid through the fluid path at the fluid pump, and a heater control configured to control operation of the fluid heater to control a degree of heat output by the heat generator of the fluid heater. The temperature control assembly is configured to increase and decrease fluid flow along the fluid path and to increase and decrease heat output of the fluid heater to control the temperature of the fluid at the fluid outlet.

In another aspect, the disclosure relates to a fluid heating apparatus for heating fluid moving along a fluid path between a fluid inlet and a fluid outlet. The fluid heating apparatus may comprise a fluid pump configured to pump fluid along the fluid path, a fluid heater configured to heat fluid moving along the fluid path, the fluid heater comprising a heat generator, and a temperature sensor configured to sense temperature of fluid on the fluid path and generate a temperature signal representative of the temperature of the fluid. The fluid heating apparatus may also comprise a temperature control assembly configured to control the temperature of fluid on the fluid path at the fluid outlet, with the temperature control assembly being in communication with the temperature sensor to receive the temperature signal. The temperature control assembly may comprise a target temperature input configured to receive designation of a target temperature for the fluid on the fluid path at the fluid outlet, a pump control configured to control operation of the fluid pump to control a flow rate of fluid through the fluid path at the fluid pump, and a heater control configured to control operation of the fluid heater to control a degree of heat output by the heat generator of the fluid heater. The temperature control assembly is configured to increase and decrease fluid flow along the fluid path and to increase and decrease heat output of the fluid heater to control the temperature of the fluid at the fluid outlet. The apparatus may further include a fluid holding tank for receiving heated fluid from the fluid heater, with the fluid holding tank having a tank interior. The apparatus may also have a fluid mixing valve configured to re-circulate fluid from the fluid holding tank into the fluid path, with the fluid mixing valve being in communication with the fluid path and being in fluid communication with the interior of the fluid holding tank through a secondary fluid path connecting the fluid mixing valve and the fluid holding tank. The apparatus may also include a fluid level sensor configured to detect a fluid level in the fluid holding tank and generate a fluid level signal representative of the fluid level in the fluid holding tank. The apparatus may also include a fluid level control configured to control a level of fluid in the fluid holding tank, with the fluid level control being in communication with the fluid level sensor to receive the fluid level signal and the fluid level control being in communication with the fluid mixing valve and configured to control the fluid mixing valve and an amount of fluid being drawn through the secondary fluid path and mixed with the fluid on the fluid path.

In yet another aspect, the disclosure relates to a temperature control assembly for a fluid heating apparatus for heating fluid moving along a fluid path between a fluid inlet and a fluid outlet, with the fluid heating apparatus being characterized by including a fluid pump for moving fluid along the fluid path, a fluid heater for heating fluid moving along the fluid path, and a temperature sensor configured to sense temperature of fluid on the fluid path and generate a temperature signal representative of the temperature of the fluid. The temperature control assembly may comprise a pump control configured to control operation of the fluid pump to control a flow rate of fluid through the fluid path at the fluid pump, a heater control configured to control operation of the fluid heater to control a degree of heat output by the heat generator of the fluid heater, and a target temperature input configured to receive designation of a target temperature for the fluid on the fluid path at the fluid outlet. The temperature control assembly may also include a comparator configured to compare the target temperature and a temperature represented by the temperature signal from the temperature sensor. The temperature control assembly may be configured to increase and decrease fluid flow along the fluid path and to increase and decrease heat output of the fluid heater to control the temperature of the fluid at the fluid outlet.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
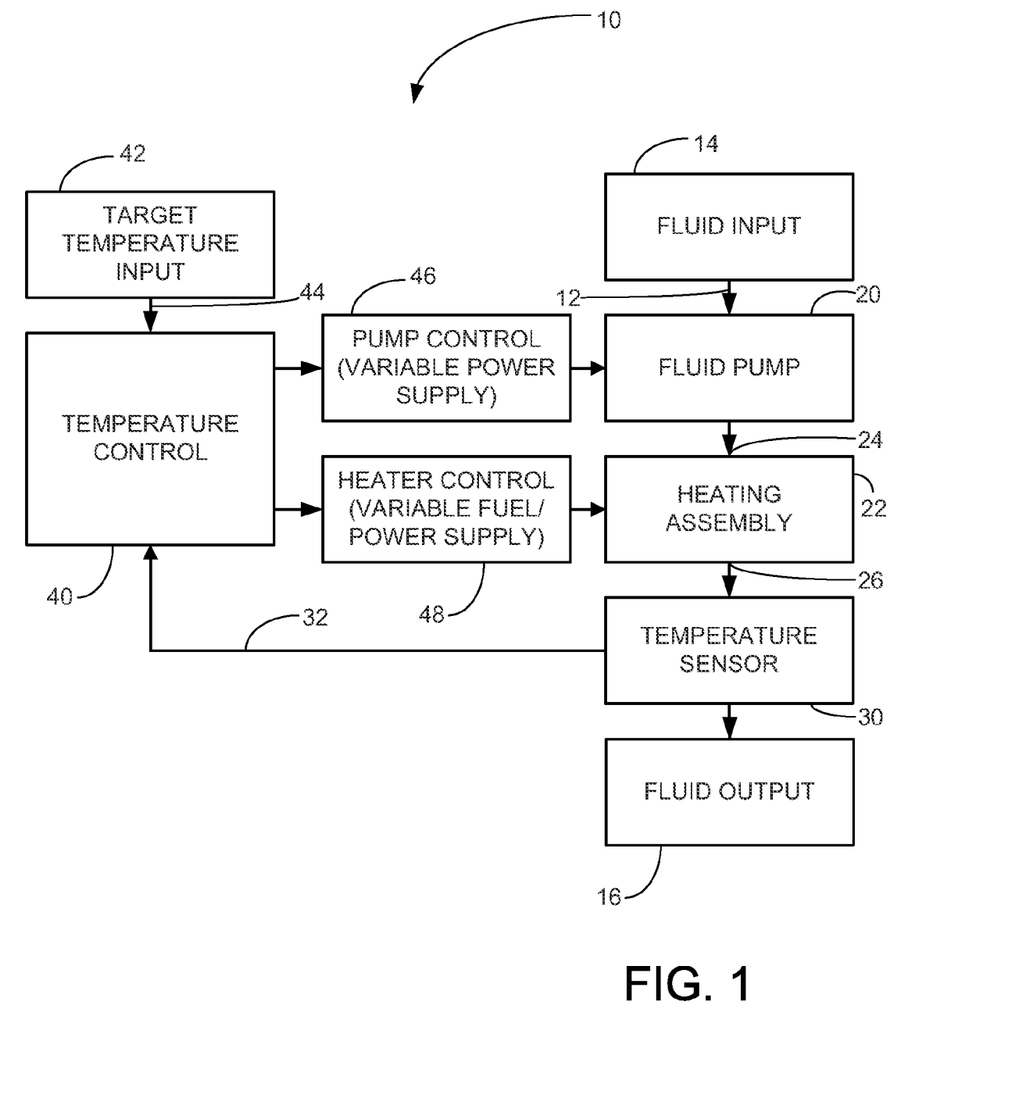
FIG. 1 is a schematic block diagram of an embodiment of an illustrative embodiment of a new system for control of a fluid heating apparatus according to the present disclosure.
Figure 2:
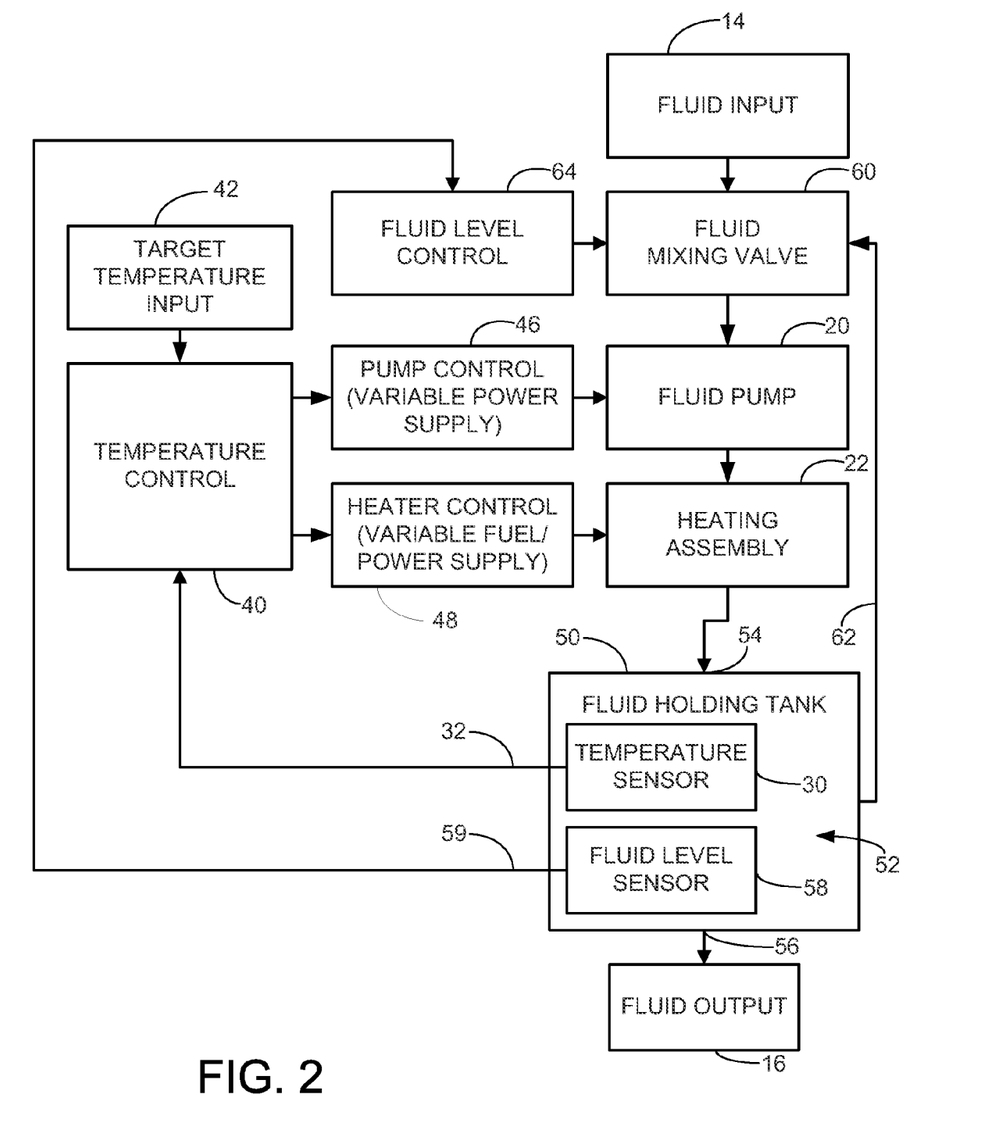
FIG. 2 is a schematic block diagram of another illustrative embodiment of the system for control of a fluid heating apparatus according to the present disclosure.
Figure 3:
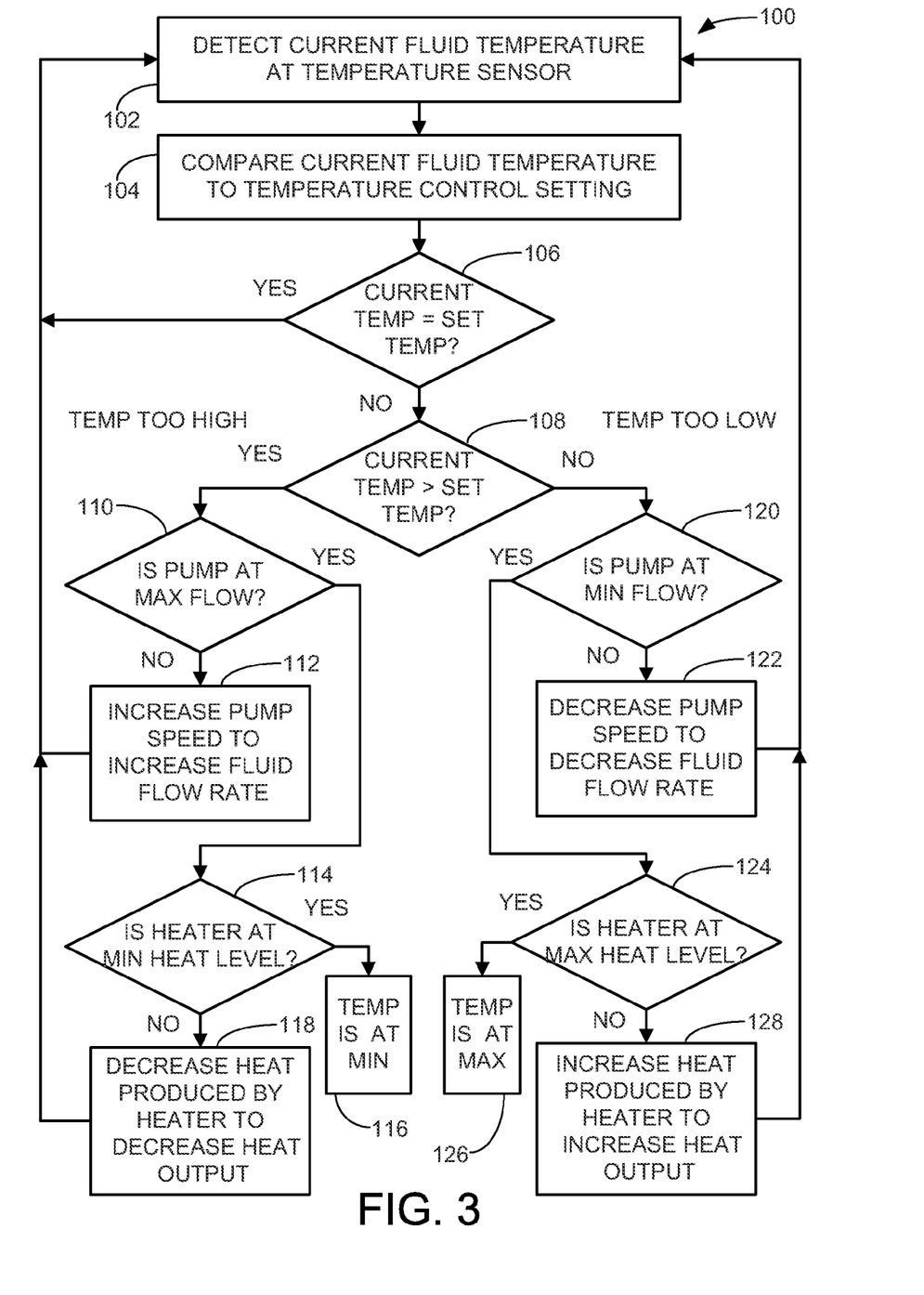
FIG. 3 is a schematic flow diagram of an illustrative implementation of a method for control of a fluid heating apparatus according to the present disclosure.

With reference now to the drawings, and in particular to FIGS. 1 through 3 thereof, a new system and method for control of a fluid heating apparatus embodying the principles and concepts of the disclosed subject matter will be described.

Applicants have recognized that the control of fluid temperature has conventionally occurred in one of two different approaches to vary the amount of heat being transferred to the fluid. One approach to controlling the temperature of the fluid output has been to vary the amount of heat output of the heat source to the fluid. Systems using this approach typically move fluid through a heat exchanger at a constant and unvarying fluid flow rate, while increasing (or decreasing) the amount of heat supplied to the fluid through the heat exchanger, to thereby increase (or decrease) the temperature of the fluid output.

Another approach to controlling the temperature of the fluid output is to vary the flow rate of the fluid flowing through the system. Systems using this approach typically supply a constant and unvarying amount of heat provided by the heat exchanger, while increasing (or decreasing) the flow rate of the fluid through the heat exchanger, to thereby decrease (or increase) the temperature of the fluid output.

Applicants have realized that systems utilizing one of these two approaches are limited in the range of maximum and minimum possible temperatures of the fluid output, and have recognized that a new system utilizing both types of control would extend the range of maximum and minimum fluid output temperatures that are possible to be produced by the system.

More specifically, the flow rate of the fluid and the heat produced by the heat source may be varied to adjust the temperature of the fluid output. The lowest outgoing fluid temperature may be produced when the heat source is at a minimum heat output and the fluid flow rate is at a maximum. Conversely, the maximum outgoing fluid temperature may be produced when the heat source is at its maximum heat output and the fluid flow rate is at a minimum. Between the minimum and maximum fluid temperatures, a broad range of temperatures can be achieved. A control system controls both the heat source and the fluid flow substantially simultaneously and automatically.

In some aspects, the disclosure relates to a fluid heating apparatus 10 suitable for heating fluid moving along a fluid path 12 between a fluid inlet 14 and a fluid output 16 (see FIG. 1). Illustratively, the fluid inlet may be in communication with a fluid source such as a municipal water supply, and the fluid outlet may be in communication with a spray gun or other devices or applications for utilizing heated fluid. In the fluid path 12, the fluid inlet 14 is located relatively upstream of the fluid outlet 16, and conversely the fluid outlet is located relatively downstream of the fluid inlet. The fluid path 12 generally defines a path of fluid movement through various elements of the apparatus.

In greater detail, the fluid heating apparatus 10 may include a fluid pump 20 which is configured to pump fluid along the fluid path, and thus the fluid pump may be in fluid communication with the path 12. Although the fluid pump may be located at various suitable positions along the fluid path between the fluid inlet and outlet, in the illustrative embodiments the fluid pump is connected to the fluid input 14 in a configuration that pumps or pushes the fluid through the remainder of the fluid path towards the fluid outlet 16. Optionally, other positions relative to the fluid path may be utilized. In some of the most preferable embodiments, the fluid pump is operated by a motor, and the motor is electrically operated, although other means of actuating the pump may be utilized.

The apparatus 10 may also include a fluid heater 22 which is configured to heat fluid moving along the fluid path through the apparatus. The fluid heater may have a fluid input 24 and a fluid output 26, and in an illustrative embodiment the fluid input is connected to the fluid pump 20 such that the fluid pump pumps or pushes the fluid through the heater 22. Various manners of heating the fluid by the fluid heater may be utilized, and suitable heating technologies are disclosed, for example, in U.S. Pat. Nos. 3,970,048; 4,007,712; 4,095,563; 4,552,162; 4,678,892; 6,006,398; 6,056,207; 6,164,557; and 8,857,736, each of which is hereby incorporated by reference in their respective entireties. A heat generator may be employed to heat the fluid passing through the fluid heater, and in some embodiments the heat generator may include an electrical heating element which is configured to convert electrical power to heat (e.g., through resistance) in order to heat the fluid passing along the fluid path. In other embodiments, the heat generator may comprise a burner which is configured to combust a fuel to generate heat to heat the fluid on the fluid path.

The fluid heating apparatus 10 may also include a temperature sensor 30 which is configured to sense the temperature of the fluid on the fluid path, and typically at a position on the fluid path that is downstream of the fluid heater 22. The temperature sensor 30 may generate a temperature signal 32 which is representative of the temperature of the fluid on the fluid path at the location of the temperature sensor. The temperature sensor may be in fluid communication with the fluid path and may be located just upstream of the fluid outlet 16 of the apparatus 10, although such a position is not critical. The temperature sensor may comprise any suitable type of temperature sensing device including, but not limited to, a thermocouple or thermistor.

The fluid heating apparatus 10 may also include a temperature control assembly 40 which is configured to control the temperature of fluid on the fluid path, such as, for example, the temperature at the fluid outlet 16. The temperature control assembly 40 may be in communication with the temperature sensor 30 to receive the temperature signal 32 generated by the temperature sensor. In some embodiments, the temperature control assembly 40 may include a target temperature input 42 which is configured to receive a designation of a target temperature for the fluid on the fluid path, and generally the fluid temperature at the fluid outlet 16. The target temperature input 42 may comprise a target temperature signal 44, which may be manually set by a control or may be set by automatic controls based upon factors internal or external to the fluid heating apparatus 10. The temperature control assembly may include a comparator or comparison capability for comparing the target temperature signal 44 to the temperature signal 32 to determine, for example, whether the temperature sensed by the temperature sensor is greater than, equals, or is less than the target temperature. Based upon the comparison, the assembly 40 may act to reduce any deviation of the sensed temperature of the fluid from the target temperature. The assembly may include a processor or other automated control to act on the results of the comparison to tend to reduce the deviation. As described below, the actions of the assembly 40 may increase or decrease the fluid flow rate and/or increase or decrease the heat applied to the fluid. Relatively small changes or adjustments in these factors may be made until a stable temperature equal or approximately equal to the target temperature is reached.

The temperature control assembly 40 may also include a pump control 46 which is configured to control operation of the fluid pump 20 in order to control the flow rate of fluid through the fluid path at the fluid pump, and thus generally through the fluid heater 22. In some embodiments, and in particular those embodiments in which the fluid pump is electrically operated, the pump control 46 may be configured to control a characteristic of the electrical power being supplied to the motor of the fluid pump in order to cause the motor to operate relatively faster or slower and thereby correspondingly increase or decrease the flow rate through the pump. It will be recognized that fluid pumps employing other types of means of operating the pump may utilize other means for controlling the flow rate produced by the pump.

Additionally the temperature control assembly may include a heater control 48 which is configured to control operation of the fluid heater 22. The heater control 48 may be configured to control the degree of heat output generated by the heat generator which is transferred to the fluid moving along the fluid path through the fluid heater. In embodiments in which the heat generator comprises an electrical heating element, the heater control 48 may be configured to control a characteristic of the electrical power being supplied to the electrical heating element of the heat generator. In embodiments in which the heat generator comprises a burner burning a fuel, the heater control 48 may be configured to control the supply of fuel to the burner.

In some embodiments, the fluid heating apparatus 10 may include a fluid holding tank 50 which is configured for receiving heated fluid from the fluid heater (see FIG. 2). Utilization of the fluid holding tank 50 may be suitable in applications in which a continuous flow of heated fluid is not required, or in which a large volume of heated fluid may be periodically required. The fluid holding tank 50 may have a tank interior 52 which is configured to receive fluid from the fluid path 12, and the tank may have a tank fluid inlet 54 and a tank fluid outlet 56. The tank fluid inlet may be in communication with the fluid path from the fluid output 26 of the fluid heater, and the tank interior may form a portion of the fluid path. In embodiments of the apparatus 10 employing the holding tank 50, the temperature sensor 30 may be configured to detect temperature of fluid in the fluid holding tank, and the temperature sensor may be located in the interior 52 of the tank, although this positioning, while beneficial, is not critical. As the tank fluid outlet 56 may form the fluid outlet 16 of the apparatus 10, the temperature of fluid in the tank 50 may reflect the temperature of fluid that is produced by the apparatus at the fluid outlet 16. Embodiments with the fluid holding tank 50 may also include a fluid level sensor 58 which is configured to detect a level of the fluid in the holding tank, and the fluid level sensor may generate a fluid level signal 59 which is representative of the fluid level in the fluid holding tank at a particular time. The fluid level sensor 58 may be located in the interior of the fluid holding tank, or at least a portion thereof may be positioned in the interior. Embodiments of the fluid heating apparatus 10 that employ the fluid holding tank may also utilize a system for recirculating fluid from the tank through the fluid heater 22 in order to maintain a desired or target temperature of the fluid in the tank 50. In such embodiments, a fluid mixing valve 60 may be configured to recirculate fluid from the interior of the fluid holding tank into the fluid path. The fluid mixing valve 60 may be in communication with the fluid path, and may be located relatively upstream of the fluid heater 22 in the path, and may also be located upstream of the fluid pump 20 in the path. The fluid mixing valve 60 may be in fluid communication with the interior of the tank 50 through a secondary fluid path 62 and the secondary fluid path may connect the fluid mixing valve to the fluid holding tank for drawing fluid from the tank to the mixing valve upon operation of the fluid pump 20. The fluid mixing valve may be of a type that may normally be completely open or completely closed, or may be of the type that has varying degrees of an open condition. The fluid mixing valve 60 may also be in communication with the fluid input 14, so that fluid exiting the valve 60 may include various degrees of "new" fluid and recirculated fluid depending upon the degree to which the mixing valve is open to these two sources of fluid.

A fluid level control 64 may be provided which is configured to control the level of fluid in the fluid holding tank. The fluid level control may be in communication with the fluid level sensor 58 to receive the fluid level signal representing the current fluid level in the tank 50. The fluid level control may also be in communication with the fluid mixing valve, and may be configured to control the condition of the fluid mixing valve to thereby control the amount (if any) of fluid that is being drawn through the secondary fluid path 62 and mixed with the fluid on the fluid path 12. By this configuration, the fluid mixing valve may be caused to reduce or stop the supply of "new" fluid from the fluid input if the fluid level sensor is detecting that the fluid level in the tank 50 is acceptable, such that the fluid moving along the fluid path through the heating assembly is primarily recirculated fluid from the tank to achieve or maintain the target temperature in the tank. Conversely, when the fluid level sensor detects that the fluid level in the tank 50 is lower than desired, the fluid mixing valve 60 may be caused by the level control 64 to provide a greater amount or degree of fluid from the fluid input rather than utilizing recirculated fluid from the secondary fluid path 62.

In another aspect, the disclosure relates to a method of heating a fluid using a fluid heating apparatus having some or all of the features and elements of the aforementioned fluid heating apparatus 10. An illustrative implementation of the method 100 (see FIG. 3) may include providing a fluid heating apparatus, such as an apparatus including a fluid pump, a fluid heater, a temperature sensor, a temperature control assembly including a pump control and a heater control.

The system may detect a current temperature of the fluid on the fluid path at a temperature sensor (block 102), and may compare the current fluid temperature to a temperature control setting for the target temperature in the fluid (block 104). If the comparison of the current fluid temperature and the target temperature determines that the current temperature is equal or approximately equal to the temperature setting (block 106), then the system continues to detect or sense the current fluid temperature (block 102) and compare it to the target temperature (block 104). If it is determined that the current temperature is not equal or substantially equal to the target temperature (block 106), then a determination is made whether the current temperature is greater or lesser than the target temperature (block 108).

If the current temperature is greater than the target temperature, and thus the fluid temperature is relatively too high with respect to the target temperature, then a sub-process may be utilized to reduce the temperature of the fluid on the fluid path. A determination may be made whether the fluid pump is operating at a maximum flow rate (block 110), and if not, then the pump speed may be increased to increase the fluid flow rate through the pump (block 112) and thus through the fluid path through the fluid heater. If it is determined that the pump is operating at the maximum flow rate for the pump (block 110), then a determination may be made whether the fluid heater is operating at a minimum heating level (block 114). In the case of a heater employing combustion, this may be determined by determining if the burner is operating at its minimum fuel burning rate. In the case of an electrically powered heater, this may include a determination of whether the heating element is operating at its minimum power setting, or if power is completely cut off to the element. If it is determined that the heater is operating at its minimum level (block 114), then a determination may be made that the temperature being produced by the heating apparatus is the minimum temperature possible (block 116) which may lead to other steps being taken that will not be detailed here. If it is determined that the heater is not operating at the minimum level (block 114), then the heat level produced by the heater assembly may be decreased in order to decrease the heat being transferred to the fluid moving along the fluid path (block 118). At this point, the current fluid temperature of the fluid is detected (block 102) and based upon the current fluid temperature then the process may be repeated to determine if further adjustments need to be made.

If a determination is made that the current temperature of the fluid on a fluid path is less than the target temperature (block 108), a sub-process may be initiated for increasing the temperature of the fluid because the current temperature is below the target temperature. A determination may be made whether the pump is operating at its minimum flow rate (block 120) and if the pump is not operating at its minimum flow rate, then the pump speed may be decreased in order to decrease the fluid flow rate on the fluid path and through the heating assembly (block 122). If it is determined that the pump is currently operating at its minimum flow rate (block 120) then a determination may be made whether the heater is operating at the maximum heating level (e.g., maximum fuel burning or maximum current being supplied) (block 124), and if the heater is operating at its maximum heating level, then a determination may be made that the temperature of the fluid is at the maximum that can be produced by the fluid heating apparatus (block 126) and additional steps may be taken that will not be detailed here. If it is determined that the fluid heater is not operating at its maximum level (block 124), then the heat output of the fluid heater may be increased (block 128) by some increment and the current temperature may again be detected (block 102) and compared (block 104) to determine if further adjustments need to be made.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps shown in the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A fluid heating apparatus for heating fluid moving along a fluid path between a fluid inlet and a fluid outlet, the fluid heating apparatus comprising:
   a fluid pump configured to pump fluid along the fluid path;
   a fluid heater configured to heat fluid moving along the fluid path, the fluid heater comprising a heat generator;
   a temperature sensor configured to sense temperature of fluid on the fluid path at the fluid outlet of the apparatus and generate a temperature signal representative of the temperature of the fluid at the fluid outlet of the apparatus;
   a temperature control assembly configured to control the temperature of fluid on the fluid path at the fluid outlet, the temperature control assembly being in communication with the temperature sensor to receive the temperature signal representative of the temperature of the fluid at the fluid outlet of the apparatus, the temperature control assembly comprising:
      a target temperature input configured to receive designation of a target temperature for the fluid on the fluid path at the fluid outlet;
      a pump control configured to control operation of the fluid pump to control a flow rate of fluid through the fluid path at the fluid pump based upon the temperature of the fluid at the fluid output;

a heater control configured to control operation of the fluid heater to control a degree of heat output by the heat generator of the fluid heater based upon the temperature of the fluid at the fluid output;

a fluid level control configured to control a level of fluid in the fluid holding tank, the fluid level control being in communication with the fluid level sensor to receive the fluid level signal, the fluid level control being in communication with the fluid mixing valve and configured to control the fluid mixing valve and an amount of fluid being drawn through the secondary fluid path and mixed with the fluid on the fluid path;

wherein the temperature control assembly is configured to increase and decrease fluid flow along the fluid path and to increase and decrease heat output of the fluid heater to move the temperature of the fluid at the fluid outlet toward the target temperature; and wherein control by the temperature control assembly first attempts to adjust an operational speed of the pump to cause the temperature of the fluid at the output to reach the target temperature, and second attempts to adjust the heat output of the heat generator to cause the temperature of the fluid at the output to reach the target temperature.

2. The system of claim 1 wherein the heat generator comprises an electrical heating element configured to convert electrical power to heat to heat fluid on the fluid path, and the heater control is configured to control a characteristic of electrical power supplied to the electrical heating element of the heat generator.

3. The system of claim 1 wherein the heat generator comprises a burner configured to combust a fuel to generate combustion in a combustion chamber, and the heater control is configured to control the supply of fuel to the burner.

4. The system of claim 1 wherein the fluid pump is operated by an electric motor, and the pump control is configured to control a characteristic of electrical power supplied to the motor of the pump to control a speed of operation of the motor operating the pump.

5. The system of claim 1 additionally comprising a fluid holding tank for receiving heated fluid from the fluid heater, the fluid holding tank having a tank interior configured to receive fluid through a tank fluid inlet and dispense fluid through a tank fluid outlet.

6. The system of claim 5 wherein the temperature sensor is configured to detect a temperature of fluid in the fluid holding tank.

7. The system of claim 5 additionally comprising a fluid mixing valve configured to re-circulate fluid from the fluid holding tank into the fluid path, the fluid mixing valve being in communication with the fluid path and being in fluid communication with the interior of the fluid holding tank through a secondary fluid path connecting the fluid mixing valve and the fluid holding tank.

8. The system of claim 7 wherein the fluid mixing valve being located upstream of the fluid pump such that operation of the fluid pump draws fluid from the fluid holding tank to the fluid mixing valve.

9. The system of claim 7 additionally comprising a fluid level sensor configured to detect a fluid level in the fluid holding tank and generate a fluid level signal representative of the fluid level in the fluid holding tank.

10. The system of claim 9 additionally comprising a fluid level control configured to control a level of fluid in the fluid holding tank, the fluid level control being in communication with the fluid level sensor to receive the fluid level signal, the fluid level control being in communication with the fluid mixing valve and configured to control the fluid mixing valve and an amount of fluid being drawn through the secondary fluid path and mixed with the fluid on the fluid path.

11. The system of claim 1 wherein the temperature signal from the temperature sensor at the fluid outlet of the apparatus is the only input to the temperature control assembly.

12. A fluid heating apparatus for heating fluid moving along a fluid path between a fluid inlet and a fluid outlet, the fluid heating apparatus comprising:

a fluid pump configured to pump fluid along the fluid path;

a fluid heater configured to heat fluid moving along the fluid path, the fluid heater comprising a heat generator;

a temperature sensor configured to sense temperature of fluid on the fluid path and generate a temperature signal representative of the temperature of the fluid;

a temperature control assembly configured to control the temperature of fluid on the fluid path at the fluid outlet, the temperature control assembly being in communication with the temperature sensor to receive the temperature signal, the temperature control assembly comprising:

a target temperature input configured to receive designation of a target temperature for the fluid on the fluid path at the fluid outlet;

a pump control configured to control operation of the fluid pump to control a flow rate of fluid through the fluid path at the fluid pump;

a heater control configured to control operation of the fluid heater to control a degree of heat output by the heat generator of the fluid heater;

wherein the temperature control assembly is configured to increase and decrease fluid flow along the fluid path and to increase and decrease heat output of the fluid heater to control the temperature of the fluid at the fluid outlet;

a fluid holding tank for receiving heated fluid from the fluid heater, the fluid holding tank having a tank interior;

a fluid mixing valve configured to re-circulate fluid from the fluid holding tank into the fluid path, the fluid mixing valve being in communication with the fluid path and being in fluid communication with the interior of the fluid holding tank through a secondary fluid path connecting the fluid mixing valve and the fluid holding tank;

a fluid level sensor configured to detect a fluid level in the fluid holding tank and generate a fluid level signal representative of the fluid level in the fluid holding tank; and a fluid level control configured to control a level of fluid in the fluid holding tank, the fluid level control being in communication with the fluid level sensor to receive the fluid level signal, the fluid level control being in communication with the fluid mixing valve and configured to control the fluid mixing valve and an amount of fluid being drawn through the secondary fluid path and mixed with the fluid on the fluid path.

13. The system of claim 12 wherein the temperature sensor is configured to detect a temperature of fluid in the fluid holding tank.

14. The system of claim 12 wherein the heat generator comprises an electrical heating element configured to convert electrical power to heat to heat fluid on the fluid path, and the heater control is configured to control a characteristic of electrical power supplied to the electrical heating element of the heat generator.

15. The system of claim 12 wherein the heat generator comprises a burner configured to combust a fuel to generate combustion in the combustion chamber, and the heater control is configured to control the supply of fuel to the burner.

16. The system of claim 12 wherein the fluid pump is operated by an electric motor, and the pump control is configured to control a characteristic of electrical power supplied to the motor of the pump to control a speed of operation of the motor operating the pump.

17. A fluid heating apparatus for heating fluid moving along a fluid path between a fluid inlet and a fluid outlet, the fluid heating apparatus comprising:

a fluid pump configured to pump fluid along the fluid path;

a fluid heater configured to heat fluid moving along the fluid path, the fluid heater comprising a heat generator;

a temperature sensor configured to sense temperature of fluid on the fluid path and generate a temperature signal representative of the temperature of the fluid;

a temperature control assembly configured to control the temperature of fluid on the fluid path at the fluid outlet, the temperature control assembly being in communication with the temperature sensor to receive the temperature signal, the temperature control assembly comprising:

a target temperature input configured to receive designation of a target temperature for the fluid on the fluid path at the fluid outlet;

a pump control configured to control operation of the fluid pump to control a flow rate of fluid through the fluid path at the fluid pump;

a heater control configured to control operation of the fluid heater to control a degree of heat output by the heat generator of the fluid heater;

wherein the temperature control assembly is configured to increase and decrease fluid flow along the fluid path and to increase and decrease heat output of the fluid heater to control the temperature of the fluid at the fluid outlet;

a fluid holding tank for receiving heated fluid from the fluid heater, the fluid holding tank having a tank interior configured to receive fluid through a tank fluid inlet and dispense fluid through a tank fluid outlet;

a fluid mixing valve configured to re-circulate fluid from the fluid holding tank into the fluid path, the fluid mixing valve being in communication with the fluid path and being in fluid communication with the interior of the fluid holding tank through a secondary fluid path connecting the fluid mixing valve and the fluid holding tank; and a fluid level sensor configured to detect a fluid level in the fluid holding tank and generate a fluid level signal representative of the fluid level in the fluid holding tank.

18. The assembly of claim 17 wherein first the pump control attempts to adjust an operational speed of the pump to cause the temperature of the fluid at the output to reach the target temperature, and second the heater control attempts to adjust the heat output of the heat generator to cause the temperature of the fluid at the output to reach the target temperature.

* * * * *